(12) United States Patent
Guter (10) Patent No.: US 11,565,356 B2
(45) Date of Patent: Jan. 31, 2023

(54) METHOD FOR PRODUCING A CUTTING HEAD

(71) Applicant: Kennametal Inc., Latrobe, PA (US)

(72) Inventor: Tim Guter, Fürth (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/034,891

(22) Filed: Jul. 13, 2018

(65) Prior Publication Data
US 2019/0015939 A1 Jan. 17, 2019

(30) Foreign Application Priority Data
Jul. 13, 2017 (DE) .......................... 102017212054.1

(51) Int. Cl.
| | |
|---|---|
| B23P 15/32 | (2006.01) |
| B21C 23/14 | (2006.01) |
| B21C 25/10 | (2006.01) |
| B22F 3/10 | (2006.01) |
| B22F 3/20 | (2006.01) |
| B22F 5/10 | (2006.01) |
| B23B 51/02 | (2006.01) |

(Continued)

(52) U.S. Cl.
CPC ............ *B23P 15/32* (2013.01); *B21C 23/001* (2013.01); *B21C 23/147* (2013.01); *B21C 25/10* (2013.01); *B22F 3/101* (2013.01); *B22F 3/20* (2013.01); *B22F 5/10* (2013.01); *B23B 51/02* (2013.01); *B23B 51/06* (2013.01); *B22F 2005/001* (2013.01); *B22F 2998/10* (2013.01)

(58) Field of Classification Search
USPC .................. 76/108.1, 108.2, 108.4, 108.6
See application file for complete search history.

(56) References Cited

U.S. PATENT DOCUMENTS

| 40,297 A | 10/1863 | Wakefield |
|---|---|---|
| 44,915 A | 11/1864 | Baker |

(Continued)

FOREIGN PATENT DOCUMENTS

| AT | 9431 B | 10/1902 |
|---|---|---|
| BR | PI04128702 | 10/2006 |

(Continued)

OTHER PUBLICATIONS

Jul. 24, 2018 Office Action (non-US).

(Continued)

*Primary Examiner* — Clark F Dexter
(74) *Attorney, Agent, or Firm* — Christopher J. Owens (57) ABSTRACT

A method for producing a replaceable cutting head is described. The replaceable cutting head is manufactured by extruding a blank. During extrusion of the blank, a number of helical coolant channels and a number of helical flutes are simultaneously formed. After extrusion, the flutes have a first angle of twist (D1), and the coolant channels have a second angle of twist (D2). After extrusion, the blank is sintered and then reworked to selectively adjust the first angle of twist (D1) and the pitch of the flutes. The method produces an endless blank that is capable of being parted off to a desired length without any sacrificial allowance, which provides significant material and cost savings as compared to conventional methods.

8 Claims, 5 Drawing Sheets

(51) Int. Cl.
  *B23B 51/06* (2006.01)
  *B23B 27/10* (2006.01)
  *B23C 5/28* (2006.01)
  *B21C 23/00* (2006.01)
  *B22F 5/00* (2006.01)

(56) References Cited

U.S. PATENT DOCUMENTS

| | | | |
|---|---|---|---|
| 329,660 A | 11/1885 | Lord | |
| 658,216 A | 9/1900 | Munger | |
| 690,093 A | 12/1901 | Beach | |
| 2,289,583 A | 7/1942 | Malone | |
| 2,423,790 A * | 7/1947 | Nelson | B24B 3/045 |
| | | | 451/374 |
| 3,410,749 A | 11/1968 | Chmiel | |
| 3,434,553 A | 3/1969 | Weller | |
| 3,765,496 A | 10/1973 | Flores et al. | |
| D262,219 S | 12/1981 | Lassiter | |
| D263,598 S | 3/1982 | Lassiter | |
| D273,387 S | 4/1984 | Lassiter | |
| D273,388 S | 4/1984 | Lassiter | |
| D273,389 S | 4/1984 | Lassiter | |
| D273,390 S | 4/1984 | Lassiter | |
| D273,391 S | 4/1984 | Lassiter | |
| D273,682 S | 5/1984 | Lassiter | |
| D274,436 S | 6/1984 | Lassiter | |
| 5,346,335 A | 9/1994 | Harpaz et al. | |
| 5,382,121 A | 1/1995 | Bicknell | |
| 5,429,199 A | 7/1995 | Sheirer et al. | |
| 5,509,761 A | 4/1996 | Grossman et al. | |
| 5,634,747 A | 6/1997 | Tukala et al. | |
| 5,769,577 A | 6/1998 | Boddy | |
| 5,791,838 A | 8/1998 | Hamilton | |
| 5,904,455 A | 5/1999 | Krenzer et al. | |
| 5,957,631 A | 9/1999 | Hecht | |
| 5,988,953 A | 11/1999 | Berglund et al. | |
| 5,996,714 A | 12/1999 | Massa et al. | |
| 6,012,881 A | 1/2000 | Scheer | |
| 6,045,301 A | 4/2000 | Kammermeier et al. | |
| 6,059,492 A | 5/2000 | Hecht | |
| 6,109,841 A | 8/2000 | Johne | |
| 6,123,488 A | 9/2000 | Kasperik | |
| 6,210,083 B1 | 4/2001 | Kammermeier et al. | |
| 6,447,218 B1 | 9/2002 | Lagerberg | |
| 6,481,938 B2 | 11/2002 | Widin | |
| 6,485,235 B1 | 11/2002 | Mast et al. | |
| 6,506,003 B1 | 1/2003 | Erickson | |
| 6,514,019 B1 | 2/2003 | Schulz | |
| 6,524,034 B2 | 2/2003 | Eng et al. | |
| 6,530,728 B2 | 3/2003 | Eriksson | |
| 6,582,164 B1 | 6/2003 | McCormick | |
| 6,595,305 B1 | 7/2003 | Dunn et al. | |
| 6,595,727 B2 | 7/2003 | Arvidsson | |
| 6,626,614 B2 | 9/2003 | Nakamura | |
| 6,648,561 B2 | 11/2003 | Kraemer | |
| 7,008,150 B2 | 3/2006 | Krenzer | |
| 7,048,480 B2 | 5/2006 | Borschert et al. | |
| 7,070,367 B2 | 7/2006 | Krenzer | |
| 7,101,125 B2 | 9/2006 | Borschert | |
| 7,114,892 B2 | 10/2006 | Hansson | |
| 7,125,207 B2 | 10/2006 | Craig et al. | |
| 7,134,816 B2 | 11/2006 | Brink | |
| 7,189,437 B2 | 3/2007 | Kidd | |
| 7,237,985 B2 | 7/2007 | Leuze et al. | |
| 7,296,497 B2 * | 11/2007 | Kugelberg et al. | B21C 23/147 |
| | | | 76/108.6 |
| 7,306,410 B2 | 12/2007 | Borschert et al. | |
| 7,309,196 B2 | 12/2007 | Ruy Frota de Souza | |
| 7,311,480 B2 | 12/2007 | Heule et al. | |
| 7,360,974 B2 | 4/2008 | Borschert et al. | |
| 7,377,730 B2 | 5/2008 | Hecht et al. | |
| 7,407,350 B2 | 8/2008 | Hecht et al. | |
| 7,431,543 B2 | 10/2008 | Buettiker et al. | |
| 7,467,915 B2 | 12/2008 | Frota de Souza | |
| 7,476,067 B2 | 1/2009 | Borschert | |
| 7,559,382 B2 | 7/2009 | Koch | |
| 7,591,617 B2 | 9/2009 | Borschert et al. | |
| D607,024 S | 12/2009 | Dost et al. | |
| 7,677,842 B2 | 3/2010 | Park | |
| 7,740,472 B2 | 6/2010 | Delamarche | |
| 7,775,751 B2 | 8/2010 | Hecht et al. | |
| 7,832,967 B2 | 11/2010 | Borschert | |
| D632,320 S | 2/2011 | Chen et al. | |
| D633,534 S | 3/2011 | Chen et al. | |
| 7,972,094 B2 | 7/2011 | Men et al. | |
| RE42,644 E | 8/2011 | Jonsson | |
| 7,997,832 B2 | 8/2011 | Prichard | |
| 7,997,836 B2 | 8/2011 | Kim et al. | |
| 8,007,202 B2 | 8/2011 | Davis et al. | |
| 8,007,208 B2 | 8/2011 | Noureddine | |
| 8,021,088 B2 | 9/2011 | Hecht | |
| 8,142,116 B2 | 3/2012 | Frejd | |
| D668,697 S | 10/2012 | Hsu | |
| D669,923 S | 10/2012 | Watson et al. | |
| 8,376,669 B2 | 2/2013 | Jaeger et al. | |
| 8,430,609 B2 | 4/2013 | Frejd | |
| 8,449,227 B2 | 5/2013 | Danielsson | |
| 8,534,966 B2 | 9/2013 | Hecht | |
| 8,556,552 B2 | 10/2013 | Hecht | |
| 8,596,935 B2 | 12/2013 | Fang et al. | |
| 8,678,722 B2 | 3/2014 | Aare | |
| 8,678,723 B2 | 3/2014 | Osawa et al. | |
| 8,721,235 B2 | 5/2014 | Kretzschmann et al. | |
| D708,034 S | 7/2014 | Huang | |
| 8,784,018 B2 | 7/2014 | Paebel | |
| 8,784,019 B2 | 7/2014 | Paebel | |
| D711,719 S | 8/2014 | DeBaker | |
| 8,882,413 B2 | 11/2014 | Hecht | |
| 8,931,982 B2 | 1/2015 | Osawa et al. | |
| 8,939,685 B2 | 1/2015 | Cigni | |
| 8,992,142 B2 | 3/2015 | Hecht | |
| 9,028,180 B2 | 5/2015 | Hecht | |
| 9,050,659 B2 | 6/2015 | Schwaegerl et al. | |
| 9,073,128 B2 | 7/2015 | Mack et al. | |
| 9,079,255 B2 | 7/2015 | Jager et al. | |
| 9,162,295 B2 | 10/2015 | Paebel et al. | |
| D742,714 S | 11/2015 | King, Jr. et al. | |
| D742,948 S | 11/2015 | Kenno et al. | |
| 9,180,650 B2 | 11/2015 | Fang et al. | |
| 9,205,498 B2 | 12/2015 | Jaeger | |
| 9,248,512 B2 | 2/2016 | Aare | |
| 9,296,049 B2 | 3/2016 | Schwaegerl et al. | |
| 9,302,332 B2 | 4/2016 | Scanlon et al. | |
| 9,371,701 B2 | 6/2016 | Cox et al. | |
| 9,481,040 B2 | 11/2016 | Schwaegerl et al. | |
| 9,498,829 B2 | 11/2016 | Zabrosky | |
| D798,922 S | 10/2017 | Frota de Souza Filho et al. | |
| 2001/0033780 A1 | 10/2001 | Berglund et al. | |
| 2002/0159851 A1 | 10/2002 | Krenzer | |
| 2002/0168239 A1 | 11/2002 | Mast et al. | |
| 2002/0195279 A1 | 12/2002 | Bise et al. | |
| 2003/0039523 A1 | 2/2003 | Kemmer | |
| 2003/0060133 A1 * | 3/2003 | Junker | B24B 3/247 |
| | | | 451/28 |
| 2003/0091402 A1 | 5/2003 | Lindblom | |
| 2004/0096281 A1 | 5/2004 | Sherman et al. | |
| 2004/0240949 A1 | 12/2004 | Pachao-Morbitzer et al. | |
| 2005/0047951 A1 * | 3/2005 | Gronquist et al. | B22F 3/20 |
| | | | 419/41 |
| 2005/0135888 A1 | 6/2005 | Stokey et al. | |
| 2006/0006576 A1 * | 1/2006 | Karos | B22F 5/10 |
| | | | 264/209.2 |
| 2006/0027046 A1 * | 2/2006 | Kugelberg et al. | B21C 23/147 |
| | | | 76/108.6 |
| 2006/0171787 A1 | 8/2006 | Lindblom | |
| 2006/0204345 A1 | 9/2006 | Borschert et al. | |
| 2006/0288820 A1 | 12/2006 | Mirchandani et al. | |
| 2008/0003072 A1 | 1/2008 | Kim et al. | |
| 2008/0175676 A1 | 7/2008 | Prichard et al. | |
| 2008/0175677 A1 | 7/2008 | Prichard et al. | |
| 2008/0181741 A1 | 7/2008 | Borschert et al. | |
| 2008/0193231 A1 | 8/2008 | Jonsson et al. | |
| 2008/0193237 A1 | 8/2008 | Men et al. | |
| 2009/0044986 A1 | 2/2009 | Jaeger et al. | |

(56) References Cited

U.S. PATENT DOCUMENTS

| | | |
|---|---|---|
| 2009/0067942 A1 | 3/2009 | Tanaka |
| 2009/0071723 A1 | 3/2009 | Mergenthaler et al. |
| 2009/0116920 A1 | 5/2009 | Bae |
| 2009/0123244 A1 | 5/2009 | Buettiker et al. |
| 2009/0311055 A1 | 12/2009 | Galota et al. |
| 2009/0311060 A1 | 12/2009 | Frejd |
| 2010/0021253 A1 | 1/2010 | Frejd |
| 2010/0092259 A1 | 4/2010 | Borschert |
| 2010/0143059 A1 | 6/2010 | Hecht |
| 2010/0150673 A1 | 6/2010 | Schneider et al. |
| 2010/0247255 A1 | 9/2010 | Nitzsche et al. |
| 2010/0266357 A1 | 10/2010 | Kretzschmann |
| 2010/0272529 A1 | 10/2010 | Rozzi et al. |
| 2010/0272531 A1 | 10/2010 | Shavit |
| 2010/0322723 A1 | 12/2010 | Danielsson |
| 2010/0322728 A1 | 12/2010 | Aare |
| 2010/0322729 A1 | 12/2010 | Paebel |
| 2010/0322731 A1 | 12/2010 | Aare |
| 2011/0020072 A1 | 1/2011 | Chen |
| 2011/0020073 A1 | 1/2011 | Chen et al. |
| 2011/0020077 A1 | 1/2011 | Fouquer |
| 2011/0027021 A1 | 2/2011 | Nelson |
| 2011/0097168 A1 | 4/2011 | Jager et al. |
| 2011/0110735 A1 | 5/2011 | Klettenheimer et al. |
| 2011/0110739 A1 | 5/2011 | Frisendahl |
| 2011/0229277 A1 | 9/2011 | Hoffer et al. |
| 2011/0236145 A1 | 9/2011 | Päbel et al. |
| 2011/0268518 A1 | 11/2011 | Sampath et al. |
| 2011/0299944 A1 | 12/2011 | Hoefermann |
| 2011/0318128 A1 | 12/2011 | Schwaegerl et al. |
| 2012/0082518 A1 | 4/2012 | Woodruff et al. |
| 2012/0087746 A1 | 4/2012 | Fang et al. |
| 2012/0087747 A1 | 4/2012 | Fang et al. |
| 2012/0114438 A1* | 5/2012 | Schwenck et al. ..... B23B 51/06 408/59 |
| 2012/0288337 A1 | 11/2012 | Sampath |
| 2012/0308319 A1 | 12/2012 | Sampath et al. |
| 2012/0315101 A1 | 12/2012 | Osawa et al. |
| 2013/0183107 A1 | 7/2013 | Fang et al. |
| 2013/0183112 A1 | 7/2013 | Schwagerl et al. |
| 2013/0223943 A1 | 8/2013 | Gey et al. |
| 2013/0259590 A1 | 10/2013 | Shaheen |
| 2013/0266389 A1 | 10/2013 | Hecht |
| 2013/0302101 A1 | 11/2013 | Scanlon et al. |
| 2014/0023449 A1 | 1/2014 | Jonsson et al. |
| 2014/0255115 A1 | 9/2014 | Zabrosky |
| 2014/0255116 A1 | 9/2014 | Myers et al. |
| 2014/0260808 A1 | 9/2014 | Sweetman et al. |
| 2014/0301799 A1 | 10/2014 | Schwaegerl et al. |
| 2014/0321931 A1 | 10/2014 | Gey |
| 2014/0348602 A1 | 11/2014 | Schwaegerl |
| 2015/0063926 A1 | 3/2015 | Wu et al. |
| 2015/0063931 A1 | 3/2015 | Wu et al. |
| 2015/0104266 A1 | 4/2015 | Guter |
| 2015/0174671 A1 | 6/2015 | Maurer |
| 2015/0266107 A1 | 9/2015 | Gonen et al. |
| 2015/0273597 A1 | 10/2015 | Aliaga et al. |
| 2015/0298220 A1 | 10/2015 | Ach et al. |
| 2015/0321267 A1 | 11/2015 | Takai |
| 2015/0328696 A1 | 11/2015 | Wang et al. |
| 2015/0360302 A1 | 12/2015 | Guter |
| 2016/0001379 A1 | 1/2016 | Kauper |
| 2016/0001381 A1 | 1/2016 | Lach |
| 2016/0016236 A1 | 1/2016 | Evans |
| 2016/0031016 A1 | 2/2016 | Takai |
| 2016/0059323 A1 | 3/2016 | Riester |
| 2016/0207122 A1 | 7/2016 | Chen |
| 2016/0229017 A1 | 8/2016 | Guy |
| 2016/0263663 A1 | 9/2016 | Schwaegerl et al. |
| 2016/0263664 A1 | 9/2016 | Son et al. |
| 2016/0263666 A1 | 9/2016 | Myers et al. |
| 2016/0311035 A1 | 10/2016 | Peng et al. |
| 2018/0133809 A1 | 5/2018 | Brunner |

FOREIGN PATENT DOCUMENTS

| | | |
|---|---|---|
| CN | 1160370 A | 9/1997 |
| CN | 1204976 A | 1/1999 |
| CN | 1258240 A | 6/2000 |
| CN | 2438535 | 7/2001 |
| CN | 1616170 A | 5/2005 |
| CN | 1689740 A | 11/2005 |
| CN | 1692998 A | 11/2005 |
| CN | 1798623 A | 7/2006 |
| CN | 101048251 A | 10/2007 |
| CN | 100455390 | 1/2009 |
| CN | 101605622 A | 12/2009 |
| CN | 101610866 A | 12/2009 |
| CN | 102006958 A | 4/2011 |
| CN | 102307693 A | 1/2012 |
| CN | 102310214 A | 1/2012 |
| CN | 102438789 A | 5/2012 |
| CN | 103128117 A | 6/2013 |
| CN | 104588739 A | 5/2015 |
| CN | 104759664 A | 7/2015 |
| CN | 204545517 | 8/2015 |
| CN | 204565232 | 8/2015 |
| DE | 94340 | 10/1897 |
| DE | 384720 | 11/1923 |
| DE | 3133488 A1 | 3/1983 |
| DE | 8303470 | 9/1983 |
| DE | 3314349 A1 | 10/1984 |
| DE | 3733298 | 4/1992 |
| DE | 19605157 | 9/1996 |
| DE | 29809638 | 8/1998 |
| DE | 10333340 A1 | 2/2005 |
| DE | 102004022747 A1 | 11/2005 |
| DE | 102007044095 A1 | 3/2009 |
| DE | 112009002001 T5 | 2/2013 |
| DE | 102012200690 A1 | 7/2013 |
| DE | 102012212146 A1 | 1/2014 |
| DE | 102013205889 | 5/2014 |
| DE | 102013209371 A1 | 11/2014 |
| DE | 102015106374 A1 | 10/2016 |
| EP | 599393 | 6/1994 |
| EP | 0599393 | 2/1996 |
| EP | 813459 | 7/2003 |
| EP | 1996358 | 11/2011 |
| EP | 2551046 A1 | 1/2013 |
| JP | S5537209 | 3/1980 |
| JP | S63109908 A | 5/1988 |
| JP | H05301104 A | 11/1993 |
| JP | 11019812 A | 1/1999 |
| JP | 2002501441 A | 1/2002 |
| JP | 2002113606 A | 4/2002 |
| JP | 2003291044 A | 10/2003 |
| JP | 2004255533 A | 9/2004 |
| JP | 2005118940 | 5/2005 |
| JP | 2005169542 | 6/2005 |
| JP | 2006167871 A | 6/2006 |
| JP | 2008500195 A | 1/2008 |
| JP | 2011036977 A | 2/2011 |
| JP | 6211769 | 9/2017 |
| KR | 101014027 | 2/2011 |
| WO | WO1984003241 | 8/1984 |
| WO | WO9627469 | 9/1996 |
| WO | WO9853943 | 12/1998 |
| WO | WO03031104 | 4/2003 |
| WO | WO2007107294 A1 | 9/2007 |
| WO | WO2008072840 A2 | 6/2008 |
| WO | WO2009128775 | 10/2009 |
| WO | WO2010102793 A1 | 9/2010 |
| WO | WO2015064904 A1 | 5/2015 |
| WO | WO2015165872 | 11/2015 |

OTHER PUBLICATIONS

May 27, 2020 Office Action (non-US) CN App. No. 108655428A.
Dec. 14, 2020 Office Action (non-US) DE App. No. 102017205166A1.
Feb. 2, 2021 Office Action (non-US) CN App. No. 108655428A.
Mar. 1, 2021 Office Action (non-US) CN App. No. 109249188A.
May 20, 2021 Office Action (non-US) CN App. No. 108655428A.

(56) References Cited

OTHER PUBLICATIONS

Oct. 22, 2021 Foreign OA—CN App. No. 201810762240.3.
Feb. 3, 2020 Examination notification CN No. 201810208355.8.
Mar. 8, 2019 Non-Final OA U.S. Appl. No. 15/937,262.
Sep. 13, 2018 Office Action CN No. 201580018557.0.
Aug. 28, 2018 Office Action JP No. 2014075465.
Jul. 24, 2018 Office Action DE No. 102012200690.7.
Jun. 6, 2018 Office Action DE No. 102013209371.3.
Jun. 5, 2018 Office Action CN No. 201410207255.5.
Mar. 6, 2018 First office action JP No. 2014075465.
Jan. 11, 2018 First Office Action CN No. 201580018557.0.
Dec. 29, 2017 Office action (3 months) 1.
Dec. 18, 2017 Second Office Action CN No. 201410207255.5.
Dec. 1, 2017 Second Office Action CN No. 201410129013.9.
Nov. 22, 2017 First office action DE No. 1020152117448.
Nov. 17, 2017 First Office Action DE No. 102017205166.3.
Sep. 19, 2017 Final Office Action.
Jul. 14, 2017 Office action (3 months) 1.
May 25, 2017 Office action (3 months) 3.
May 9, 2017 Second Office Action JP No. 2013-6979.
Apr. 19, 2017 First Office Action CN No. 201410129013.9.
Apr. 6, 2017 Second Office Action IL No. 231436.
Apr. 6, 2017 First office action DE No. 102014206796.0.
Apr. 1, 2017 First Office Action CN No. 201410207255.5.
Mar. 21, 2017 Office action (3 months) 1.
Feb. 10, 2017 Advisory Action (PTOL-303) 2.
Nov. 23, 2016 Final Office Action 2.
Nov. 16, 2016 Second Office Action CN No. 201310024382.7.
Nov. 15, 2016 EPO Notification R161(1) & R.162 EP No. 15717103.4.
Oct. 25, 2016 Office action (3 months) 1.
Sep. 27, 2016 First office action JP No. 2013-6979.
Jul. 13, 2016 First office action IL No. 58345.
Jul. 29, 2016 Office action (3 months) 2.
May 17, 2016 Advisory Action.
Mar. 23, 2016 First office action CN No. 201310024382.7.
Mar. 7, 2016 Final Office Action.
Feb. 23, 2016 Office action (3 months) 2.
Dec. 8, 2015 Office action (3 months) 1.
Nov. 6, 2015 Final Office Action.
Nov. 3, 2015 Final Office Action.
Oct. 22, 2015—Non-Final Office Action.
Oct. 12, 2015 First office action IL No. 231436.
Jul. 7, 2015 Office action (3 months) 1.
May 13, 2014 Office Action (non-US) DE 102013209371.3.
Stemmer, Caspar Erich, "Ferramentas de corte II", Engenharia Mecânica, Universidade Tecnológica Federal do Paraná (UTFPR), 1995, p. 26.

* cited by examiner

METHOD FOR PRODUCING A CUTTING HEAD

RELATED APPLICATION DATA

The present application claims priority pursuant to 35 U.S.C. § 119(a) to German Patent Application No. 102017212054.1 filed Jul. 13, 2017, which is incorporated herein by reference in its entirety.

FIELD

The invention relates to a method for producing a cutting head as well as to the corresponding cutting head.

BACKGROUND

Cutting heads are generally inserted into a base body, carrier, or shaft of a cutting tool, e.g., a drill, on the front end. For this purpose, the base body generally comprises a receptacle into which the cutting head is inserted. The cutting head and the base body are connected to each other by means of suitable coupling elements.

The cutting head is often manufactured from a particularly durable material, e.g., hard metal, whereas the mechanical requirements for the base body are generally different and the base body is then, for example, manufactured from a more inexpensive material, e.g., steel.

In a possible production method for a cutting head, a blank is first preformed, e.g., from hard metal, then sintered, and subsequently reworked. During preforming, coolant channels can be formed in the blank at the same time. During reworking, flutes as well as major and minor cutting edges are then ground in and the cutting head is generally brought into the desired final shape. Such a production method is very complex and, first and foremost, very material-intensive particularly with respect to the reworking.

SUMMARY

Against this background, it is an aim of the invention to specify an improved method for producing a cutting head. The production of the cutting head is to be as material-saving as possible. A corresponding cutting head is moreover to be specified. This cutting head is accordingly to be producible more cost-effectively.

The aim is achieved according to the invention by a method with the features according to claim 1 and by a cutting head with the features according to claim 9. Advantageous embodiments, refinements and variants are the subject-matter of the dependent claims. In this respect, the embodiments in connection with the method also apply accordingly to the cutting head, and vice versa.

The method serves to produce a cutting head for a cutting tool. The cutting tool is a rotary tool, e.g., a drill. The cutting head is also called a cutting insert. The cutting head can be mounted on the front end of a base body of the cutting tool, e.g., by means of appropriate coupling elements. The cutting head is manufactured from a blank, wherein the blank is produced by means of extrusion, i.e., the blank is formed from a material to be extruded, i.e., a material which is extruded.

During the extrusion, a number of coolant channels is formed. These coolant channels extend longitudinally within the blank. The coolant channels are, for example, formed by means of nylon threads, which serve as placeholders during extrusion. In the cutting head, the coolant channels serve in particular to supply coolant or lubricant. A number of flutes is moreover formed during extrusion. In contrast to the coolant channels, which run inside the blank, the flutes are formed as recesses on the outside of the blank. The flutes in the cutting head serve in particular to transport away chips removed by the cutting head. The number of coolant channels preferably corresponds to the number of flutes.

The coolant channels and the flutes are in each case formed helically during extrusion. The coolant channels and the flutes thus in each case follow a helical course about a longitudinal axis of the blank. The coolant channels and the flutes in each case have a pitch, namely the coolant channels a coolant channel pitch and the flutes a flute pitch. The coolant channel pitch and the flute pitch are in principle the same after extrusion. In other words, in consequence of the manufacturing technology, the pitches are the same since the coolant channels and the flutes are formed together during extrusion, i.e., substantially at the same time, i.e., precisely not in separate method steps. During extrusion, a direction of rotation is imprinted onto the extruded material so that the coolant channels and the flutes are automatically produced helically. As a result, a blank with helical coolant channels and helical flutes is produced directly during extrusion. The particular pitch results in an angle of twist, namely a coolant channel angle for the coolant channels and a flute angle for the flutes, in which they are respectively positioned in relation to the longitudinal axis. The angles of twist are generally not identical, namely when the coolant channels are arranged further inward in the radial direction than the flutes.

After extrusion, the flutes have a pitch, namely a flute pitch, which initially corresponds to a pitch of the coolant channels, i.e., a coolant channel pitch. The flute pitch also determines the angle of twist of the flute. At times, however, an angle of twist differing from the produced angle of twist is required. After extrusion, the pitch is now adjusted by grinding the flutes to a finished dimension. The pitch is in this case in particular changed so that the flutes have a changed pitch after grinding. The grinding to the finished dimension is also called finish-grinding. The pitch is thus in particular also changed during the grinding after extrusion.

By adjusting and in particular changing the pitch of the flutes, their angle of twist is expediently adjusted. In other words: the pitch and the angle of twist of the flutes are adjusted subsequently, i.e., after extrusion. The flutes are accordingly reworked in order to adjust their angle of twist, i.e., the flute angle. As a result, cutting heads with different flute angles can advantageously be produced, in particular starting from similar blanks. The finished dimension is in particular a final design of the flutes; i.e., by grinding to the finished dimension, the flutes are brought into a final shape. After grinding to the finished dimension, the course of the flutes and especially the flute angle are in particular not changed further.

A core idea of the invention consists in particular in already preforming the flutes during the manufacturing of the blank and not first creating the flutes by subsequent machining of a blank without flutes. This results in a significant material savings, in particular of up to 25% in comparison with traditional production, i.e., subsequent grinding-in of the flutes. Instead of machining the flutes out of a whole piece, a material savings is already achieved during the production of the blank. The production method is thus particularly material-saving and the cutting heads produced in this way are clearly more cost-effective.

During the adjustment of the angle of twist of the flutes, the angle of twist does not necessarily have to be changed.

Rather, in one variant, the angle of twist obtained by extrusion is maintained and in this respect adjusted to the already existing dimension. A significant advantage of the invention, however, consists in the fact that the angle of twist can be adjusted almost arbitrarily as a result of the special production method, in particular independently of the angle of twist of the coolant channels. In an advantageous variant, the angle of twist is then adjusted after extrusion by changing the angle of twist during the grinding to the finished dimension. In this case, the flutes are also ground to a finished dimension. The pitch and angle of twist are thus changed purposefully in order to obtain flutes with the desired angle of twist in the final shape.

After extrusion, the blank is preferably sintered so that the material of which the blank consists hardens. During sintering, the material is hardened and the blank generally shrinks; its shape as well as the course of the flutes and coolant channels, however, are basically maintained in the process.

After sintering, the blank is expediently reworked and brought into the final shape, i.e., the cutting head is produced in the final shape. The blank is preferably reworked after extrusion and in particular also after sintering such that a number of cutting edges are ground into the blank. These cutting edges in the cutting head then serve to machine a workpiece. The blank is in particular also reworked such that a coupling element is formed in order to connect the cutting head to a base body. The cutting edges are in this case generally formed on the front end of the cutting head; a coupling element is generally formed on the back end. The reworking thus preferably consists in grinding the blank into a final shape, i.e., into the finished cutting head.

During extrusion, the flutes are expediently formed directly with full depth so that a reworking of the flutes for further deepening is no longer required and advantageously omitted. A maximum material saving is thereby in particular achieved. This is however not mandatory; rather, the flutes in one variant are not formed with full depth and are then brought into a final shape as part of a reworking. It is essential that at least a portion of the flutes is already formed during extrusion.

Preferably produced during extrusion is an endless blank, off which the blank is parted. The fact that a blank of any length can be produced particularly easily as a result of the extrusion is advantageously exploited in the process. The method is thus particularly flexible. The material is accordingly extruded by an extrusion nozzle and a portion, i.e. a longitudinal section of the extruded material, is parted off, i.e., separated or cut off, behind the extrusion nozzle as a blank. The extrusion is then expediently continued in order to produce another blank. The blank is accordingly advantageously produced as one of several blanks, which are parted off one after the other. The method is thus advantageously suitable for easy mass production of blanks. In the process, the blanks can even be produced advantageously with different lengths.

In particular for the reworking of the blank, the blank must routinely be clamped in a holding device, wherein portions of the blank are then covered and accordingly not accessible to reworking. In order to nonetheless be able to machine the blank as completely as possible, it is possible to manufacture the blank with a so-called sacrificial pin, i.e., with a sacrificial allowance. The blank is thus made longer than is actually necessary. The sacrificial allowance then serves as holding section for clamping the blank during reworking. A particular advantage of the present method is that the flutes are already formed during the production, in particular during the initial shaping, of the blank and not introduced subsequently, in particular within the scope of a reworking. As a result, an sacrificial allowance can therefore advantageously be dispensed with and the blank can be manufactured directly in the actually sufficient length.

The blank is therefore preferably parted off from the endless blank without any sacrificial allowance, i.e., in particular without any sacrificial pin or holding section for reworking. The blank is accordingly produced without any allowance or without any sacrificial pin. Corresponding material is advantageously saved thereby, which would otherwise subsequently be separated and discarded after reworking. The blank is in particular precisely parted off in the length that the finished cutting head is to have. A shrinking within the context of sintering is, where applicable, taken into consideration in the process. It is also in particular taken into account that the blank is still to be ground smooth on the front or rear ends, where applicable. During a reworking, the blank is, for example, held in the center and then machined on the front end or on the rear end or on the front and rear ends. A machining of the center is advantageously omitted since the flutes are already formed.

During adaptation of the flute angle, there is basically the risk of the coolant channels being exposed. The cutting head therefore preferably has a length in the range of 5 to 30 mm. In cutting heads of such a length, it is then advantageously possible to change the flute angle in a broad range, in particular by up to 15°, without hitting the coolant channels in the process. The flutes are formed in an outer region of the blank. The flutes have a certain depth and thereby define a core region, which is surrounded by the outer region. No flutes are formed in the core region. The outer region is in particular formed to be annular and concentric in relation to the core region, which is in particular circular. The coolant channels are expediently formed in the core region. As a result, the degree of freedom during reworking of the flutes is considerably increased since the now internal coolant channels can no longer be affected by a change of the flute angle. This design is in particular based on the idea that an arrangement of the coolant channels outside the core region, i.e., in the outer region, is indeed advantageous in terms of mechanical engineering but not particularly important in the case of a cutting head, in particular with a length as described above. In contrast, the arrangement of the coolant channels in the core region allows a flute angle correction in a particularly broad value range.

The blank is in particular extruded by means of an extrusion nozzle, i.e., the material from which the blank is produced is pressed or extruded through an extrusion nozzle. The extrusion nozzle advantageously comprises a circular aperture or mold opening, into which a shaping projection protrudes for each of the flutes. The aperture accordingly consists of a circle, from the circumference of which projections protrude inwardly. The shape of a projection corresponds to the cross-section of a respective flute. An additional profiling, e.g., in serrated shape, is on the other hand dispensed with; rather, the blank is formed with a smooth shell surface. A profiling of the aperture, more precisely of an inner contour of the aperture, is basically possible and also suitable for in particular achieving a rotational movement of the blank during extrusion so that helical coolant channels and helical flutes are formed. The blank produced is then however also accordingly profiled and must be ground down subsequently. Such a profiling is therefore advantageously dispensed with and material and working hours are thereby accordingly saved. This is in particular based on the knowledge that a rotational movement can already be generated during extrusion as a result of the projections for forming the flutes and that an additional profiling is advantageously no longer necessary. The blank is therefore advantageously extruded directly with a smooth shell surface, i.e., surface or outer surface.

A cutting head according to the invention is produced according to a method as described above. The cutting head then comprises a number of helical flutes as well as a number of helical coolant channels. The coolant channels emerge in particular at the front end of the cutting head. At the front end, the cutting head moreover comprises a number of cutting edges. The cutting head is in particular designed as an exchangeable part of a cutting tool. At the rear end, the cutting head therefore preferably comprises a coupling element for connecting to a complementary coupling element of a shaft or base body of the cutting tool.

The cutting tool is preferably manufactured of hard metal, in particular of tungsten carbide. The cutting head is preferably formed in one piece, i.e., consists of only a single material. In this case, the cutting head in particular consists entirely of hard metal.

The cutting head preferably has a diameter in the range of 6 to 20 mm. The cutting head preferably has a length in the range of 5 to 30 mm. The cutting head preferably comprises two flutes and two coolant channels. A flute in each case preferably has a depth in the range of up to 15% of the cutting edge diameter, i.e., approximately up to 15% of half the diameter of the cutting head.

BRIEF DESCRIPTION OF THE DRAWINGS

Exemplary embodiments of the invention are explained in greater detail below with reference to the figures. Shown schematically in each case are:

FIG. 1 a method for producing a cutting head,
FIG. 2A a cutting head in a front view,
FIG. 2B the cutting head of FIG. 2A in a side view,
FIG. 3A a blank in a perspective view,
FIG. 3B the blank of FIG. 3A in a front view,
FIG. 4 the extrusion in the method of FIG. 1,
FIG. 5A an extrusion nozzle in a front view,
FIG. 5B an alternative extrusion nozzle in a front view,
FIG. 6 a variant of the blank in a front view.

DETAILED DESCRIPTION

Figure 1:
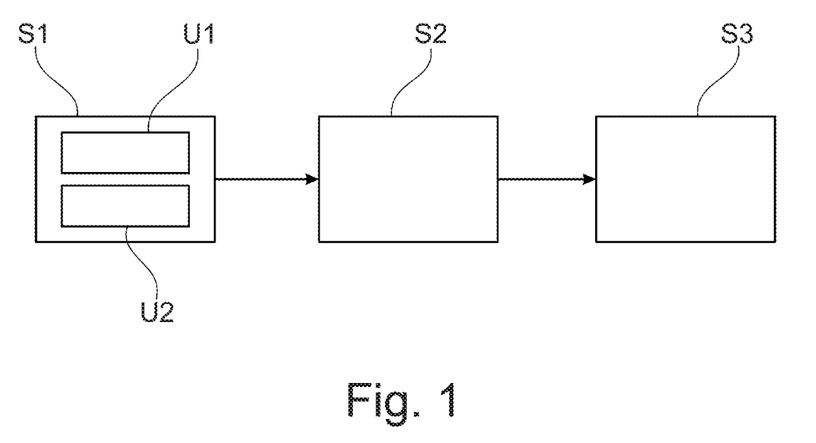
Figure 2A:
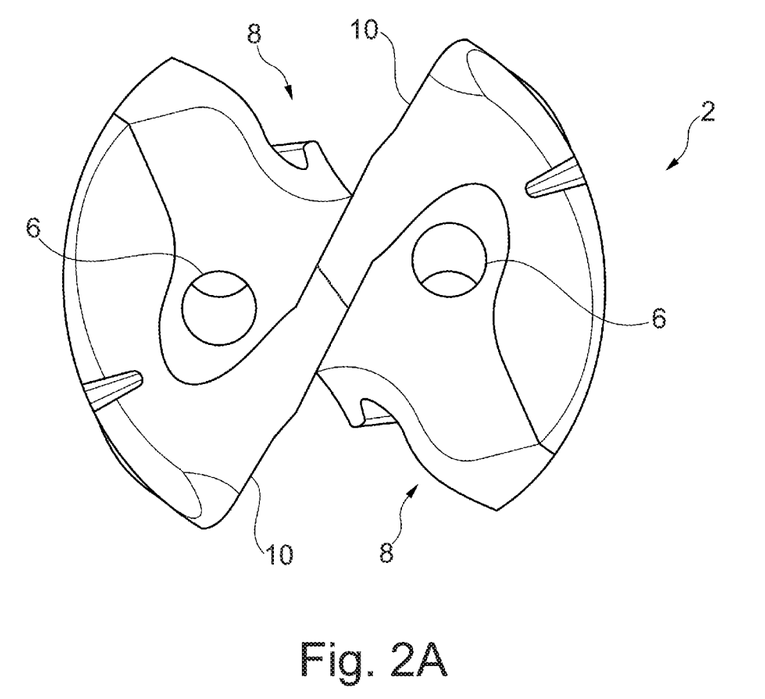
Figure 2B:
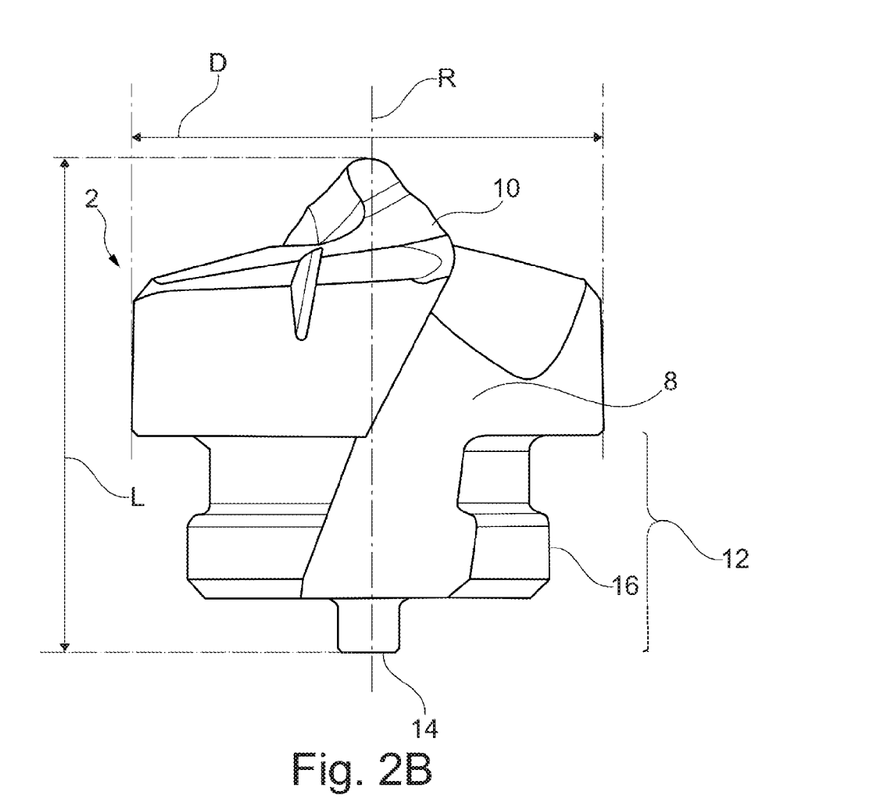

FIG. 1 shows the sequence of a method according to the invention for producing a cutting head 2 for a cutting tool not shown in more detail. An exemplary cutting head 2 produced by means of the method is shown in FIG. 2A, 2B. The cutting head 2 is in this case designed as a cutting insert or even as a drill bit for a drill. The cutting head 2 shown is manufactured from tungsten carbide and also formed in one piece, i.e., it consists in the present case only of tungsten carbide. The cutting head 2 in FIG. 2A, 2B has a diameter D of 25 mm and a length L of 30 mm.

Figure 3A:
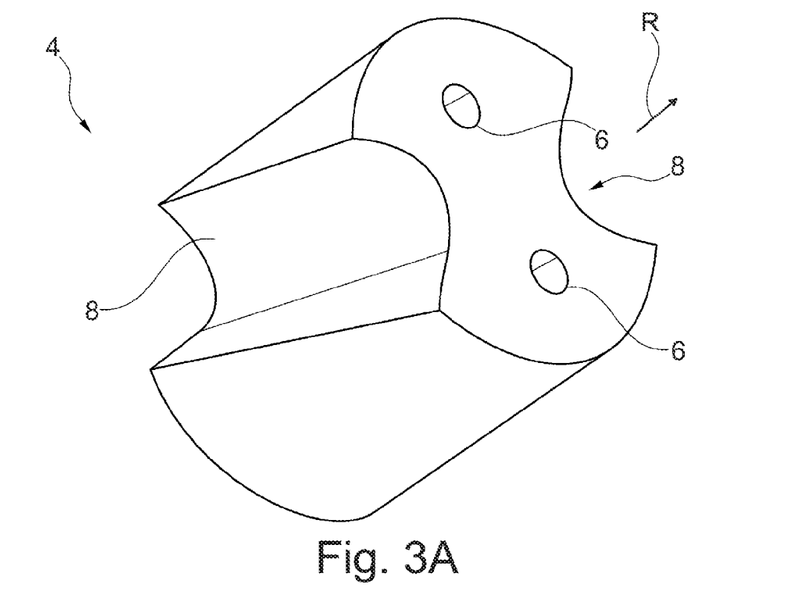
Figure 3B:
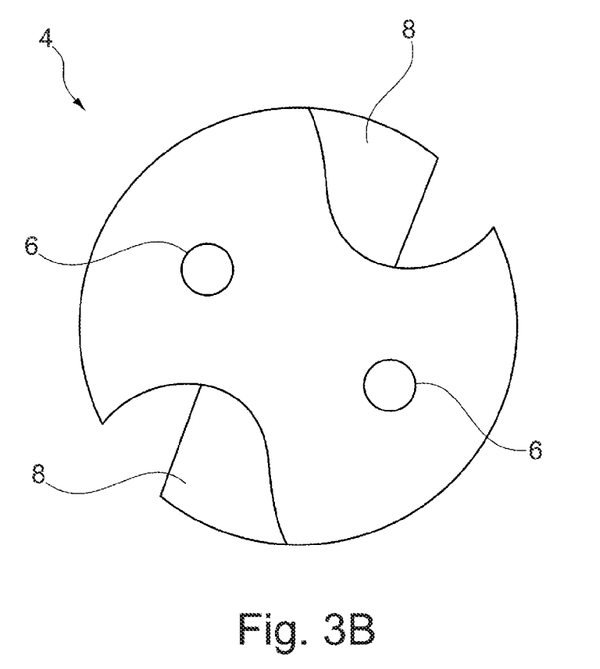

The cutting head 2 is manufactured from a blank 4, which is produced in a first step S1 by means of extrusion, i.e., the blank 4 is formed from an extruded material. An exemplary blank 4 is shown in FIG. 3A, 3B. During the extrusion, a number of coolant channels 6, in this case two coolant channels 6, is formed. These coolant channels extend longitudinally within the blank 4. The coolant channels 6 are, for example, formed by means of nylon threads, which serve as placeholders during extrusion. A number of flutes 8, in this case two flutes 8, is moreover formed during extrusion. In contrast to the coolant channels 6, which run inside the blank 4, the flutes 8 are formed as recesses on the outside of the blank 4. The formation of coolant channels 6 takes place in a first substep U1 of the first step S1. The formation of flutes 8 takes place in a second substep U2 of the first step S1. The two substeps U1, U2 in FIG. 1 take place simultaneously. The coolant channels 6 and the flutes 8 are accordingly respectively formed during extrusion, i.e., in the same first step S1. The flutes 8 are thus not first created by subsequent machining of a blank without flutes but are already preformed during manufacturing of the blank 4. This results in a significant material saving.

The coolant channels 6 and the flutes 8 are moreover in each case formed helically during extrusion; they thus in each case follow a helical course about a longitudinal axis R of the blank 4. With respect to the longitudinal axis R, the coolant channels 6 have a first angle of twist D1 and the flutes 8 have a second angle of twist D2. In the flutes 8, the angle of twist D2 is also called the flute angle. The angles of twist D1, D2 result from a respective pitch for the coolant channels 6 and the flutes 8. In this case, the pitch of the coolant channels 6 is equal to the pitch of the flutes 8 in consequence of the production. During extrusion, a direction of rotation is imprinted onto the extruded material so that the coolant channels 6 and the flutes 8 are automatically produced helically. The angles of twist D1, D2 are not necessarily identical depending on the relative position of the coolant channels 6 and the flutes 8, namely not when they extend at different distances in relation to the longitudinal axis R of the blank 4. The coolant channels 6 and the flutes 8 in the present case are however separated from the longitudinal axis R in the radial direction at about the same distance so that the angles of twist D1, D2 are approximately equal.

After extrusion in the first step S1, the blank 4 is sintered in a second step S2 so that the material of which the blank 4 consists hardens. During sintering, the material is hardened and the blank 4 generally shrinks so that the diameter D and the length L are correspondingly reduced. The essential shape, i.e., the course of the flutes 8 and the coolant channels 6 are however basically maintained in the process.

After sintering, the blank 4 is reworked in a third step S3 and the cutting head 2 is produced in the final shape, e.g., as in FIG. 2A, 2B. During reworking in the third step S3, a number of cutting edges 10 are ground into the blank 4. These cutting edges in the cutting head 2 serve to machine a workpiece. The blank 4 for the cutting head 2 in FIG. 2A, 2B was moreover also reworked such that a coupling element 12 is formed in order to connect the cutting head 2 to a base body not shown. The coupling element is visible in particular in FIG. 2B and comprises a pin 14 and a collar 16 for mounting in the manner of a bayonet lock. The cutting edges 10 are formed on the front end of the cutting head 2; the coupling element 12 is formed on the rear end. The coolant channels 6 serve to supply coolant or lubricant and extend through the entire cutting head 2. The flutes 8 serve to transport chips away and also extend across the entire cutting head 2. In the exemplary embodiment shown, the number of coolant channels 6 corresponds to the number of flutes 8.

The flutes 8 in the exemplary embodiment shown are already formed with full depth in the first step S1 so that a reworking of the flutes for further deepening in particular in step S3 is omitted. In a variant not shown, the flutes 8 are however not formed with full depth and then brought into a final shape within the scope of reworking in the third step S3.

Figure 4:
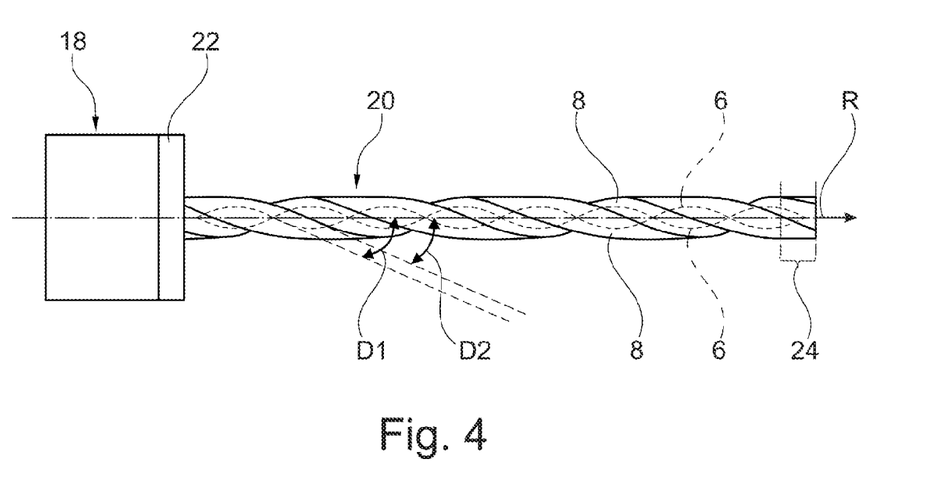

In FIG. 4, the first step S1, i.e., the extrusion of the blank 4, is shown in more detail. In the process, an endless blank 20 is produced by means of an extrusion system 18, which endless blank extends in the longitudinal direction R and off which endless blank the blank 4 is then parted. The blank 4 can accordingly be produced with any length L. The coolant channels 6 are marked by helical dashed lines. It can be seen clearly that the angle of twist D1 of the coolant channels 6 corresponds to the angle of twist D2 of the flutes 8 in the exemplary embodiment shown.

The material for the blank 4 is extruded through an extrusion nozzle 22. Behind the extrusion nozzle 22, a portion, i.e., a longitudinal section 24 of the extruded material, i.e., of the endless blank 20, is parted off, separated or cut off, as blank 4. Extrusion is then continued in order to produce another blank 4. In the exemplary embodiment shown, the blank 4 is accordingly produced as one of several blanks 4, which are parted off one after the other from the endless blank 20. In a variant, blanks 4 are parted off with different lengths L.

Figure 5A:
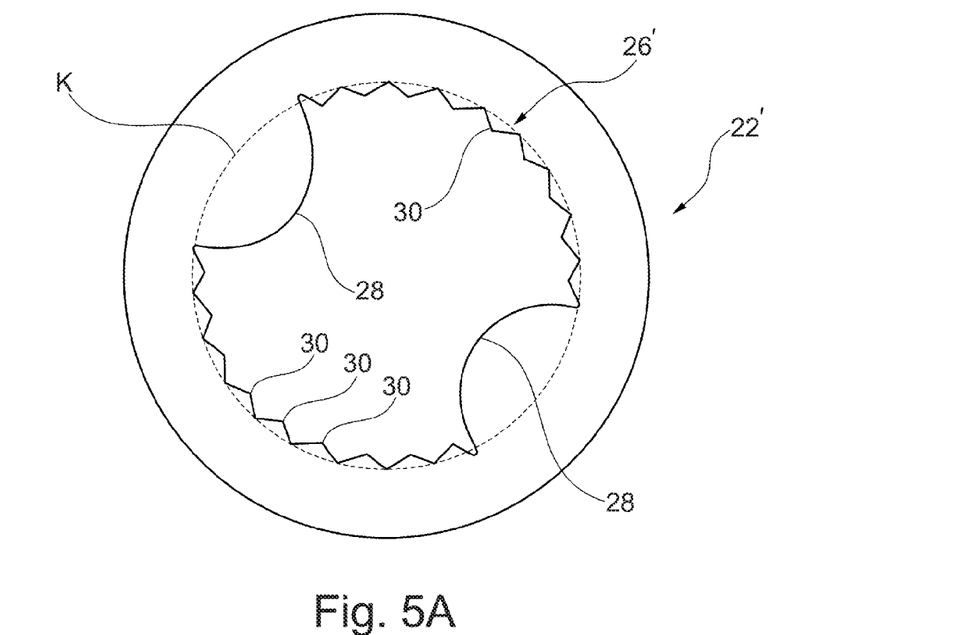
Figure 5B:
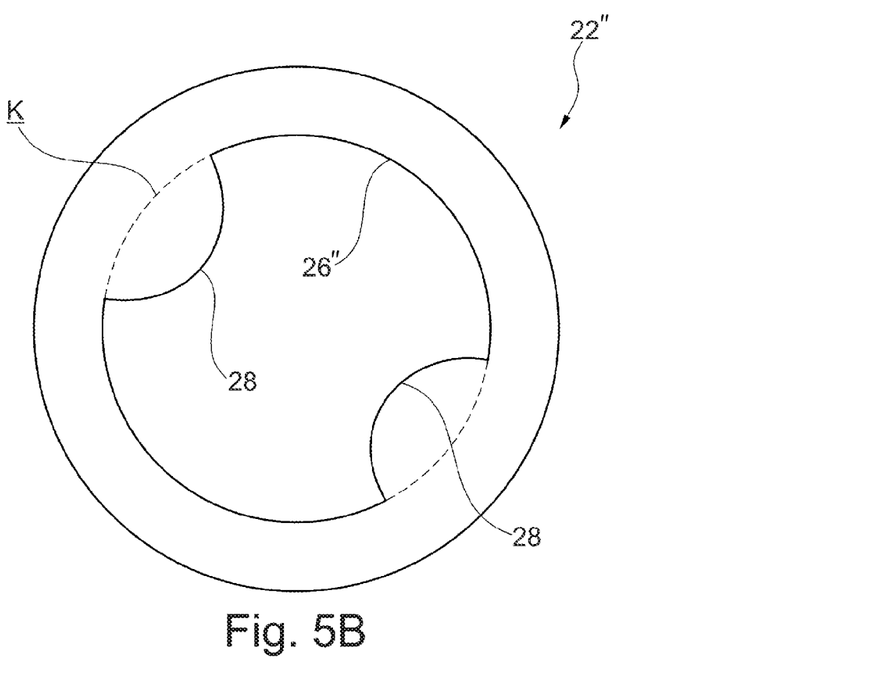

The extrusion nozzle 22 imprints a twist onto the material as already mentioned above so that the coolant channels 6 and the flutes 8 are formed helically, i.e., already exist in a helical shape in the endless blank 20. For this purpose, the extrusion nozzle 22 comprises an appropriate aperture 26. Exemplary extrusion nozzles 22 are shown in FIG. 5A, 5B. The aperture 26' of the extrusion nozzle 22' in FIG. 5A comprises a number of projections 28 for forming the flutes 8 as well as a profiling therebetween with a plurality of teeth 30 for generating the twist, i.e., a rotational movement. The shape of a projection 28 corresponds to the cross-section of a corresponding flute 8. On the other hand, the aperture 26'' of the extrusion nozzle 22'' in FIG. 5B is formed without profile, i.e., does not have any profile or any teeth 30, but is instead circular, except for the projections 28 for the flutes 8. In other words, the aperture 26 consists of a circle K, from the circumference of which projections 28 protrude inwardly. The rotational movement during extrusion is in this case only generated by the projections 28.

In the method shown, the flutes 8 are already formed during the initial shaping of the blank 4 so that an allowance for the purposes of holding the blank during reworking can be dispensed with and is also dispensed with. The blank 4 is manufactured directly in the actually sufficient length L. In other words, the blank 4 is parted off from the endless blank 20 without any sacrificial allowance and precisely in the length L that the finished cutting head 2 is to have. A shrinking within the scope of sintering in the second step S2 is, where applicable, taken into consideration in the process.

In order to adapt the angle of twist D2 of the flutes 8, the second angle of twist D2, i.e., the flute angle, is adjusted, in the present case even changed by regrinding the flutes 8.

Figure 6:
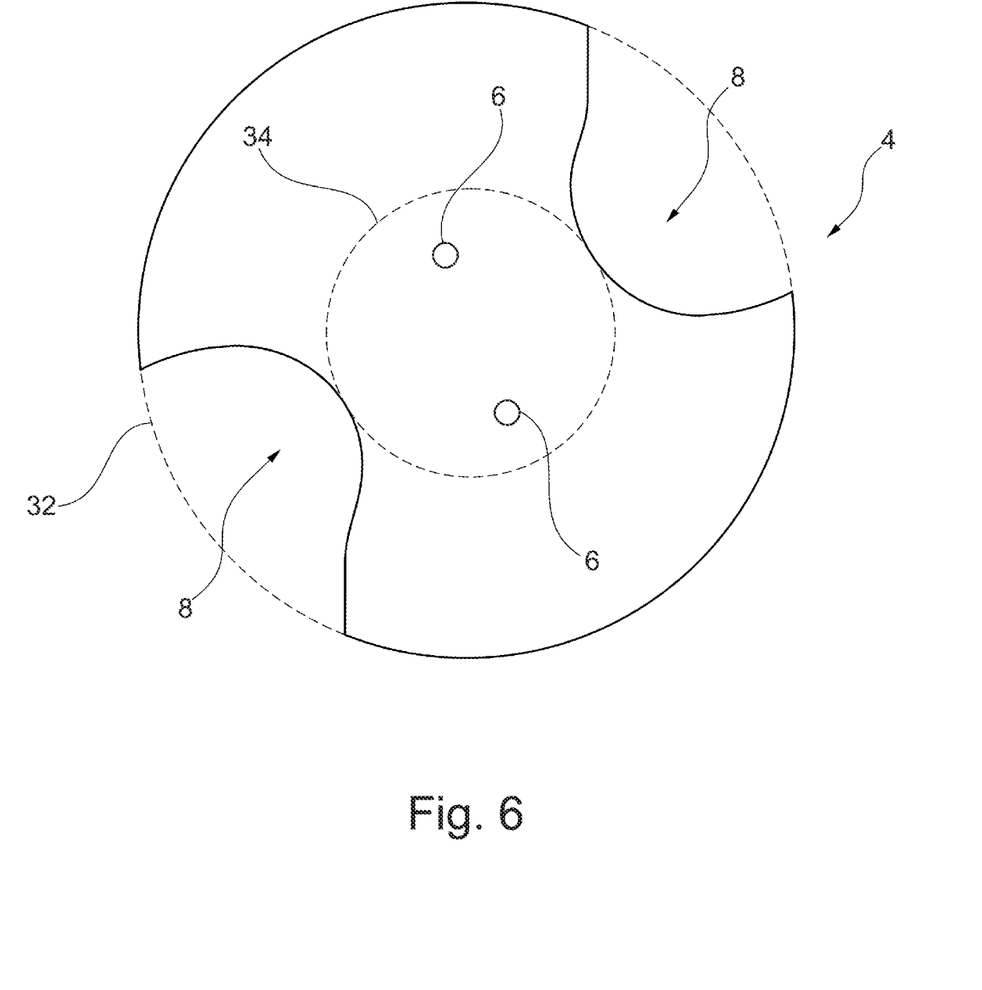

This takes place, e.g., during reworking in the third step S3. Since the cutting head 2 only has a short length L, i.e., in particular a length of less than 10 mm, there is also no risk of exposing the coolant channels 6 when the angle of twist D2 of the flutes 8 is adapted. In a variant not shown, the flutes are only formed in an outer region 32 of the blank 4. The flutes 8 have a certain depth and thereby define a core region 34, which is surrounded by the outer region 32. No flutes 8 are accordingly formed in the core region 34. In FIG. 6, a corresponding variant of the blank 4 is shown. It can be seen clearly in FIG. 6 how the outer region 32 is formed to be annular and concentric in relation to the circular core region 34. In the variant mentioned and not shown, the coolant channels 6 are then formed in the core region 34, whereby the now internal coolant channels 6 are no longer affected by a change of the angle of twist D2 of the flutes 8.

The invention claimed is:

1. A method of producing a replaceable cutting head, the replaceable cutting head comprising a plurality of cutting edges defining a cutting diameter, a plurality of coolant channels having a first angle of twist (D1), a plurality of flutes having a second angle of twist (D2) and a coupling element comprising a pin and a collar, the method comprising:
   extruding an endless blank to simultaneously form the plurality of coolant channels having the first angle of twist (D1) and the plurality of flutes having the second angle of twist (D2);
   cutting the endless blank to produce a first blank having a desired length (L) of a finished replaceable cutting head without any sacrificial allowance; and
   sintering the first blank; and
   reworking the first blank to form the coupling element comprising the pin and the collar for attaching the finished replaceable cutting head to a base body of a drill,
wherein, after the step of cutting the endless blank to produce the first blank, cutting the endless blank again to produce a second blank for a second replaceable cutting head without any sacrificial allowance.

2. The method of claim 1, wherein, during the step of extruding the endless blank, the endless blank comprises an annular outer region concentric with a core region, wherein, the plurality of flutes are formed only in the annular outer region of the first blank and the plurality of coolant channels are formed only in the core region, thereby preventing exposing the plurality of coolant channels during the step of reworking the first blank.

3. The method of claim 1, wherein the length of the replaceable cutting head ranges between about 5 mm to about 30 mm and the cutting diameter ranges between about 6 mm to about 20 mm.

4. The method of claim 1, wherein, after the step of extruding the endless blank, each flute of the plurality of flutes has a depth up to about 15% of a cutting diameter of the finished replaceable cutting head.

5. The method of claim 1, wherein, during the step of reworking the first blank, selectively adjusting the second angle of twist (D2) of each flute by up to about 15 degrees.

6. The method of claim 1, wherein, during the step of extruding the endless blank, the endless blank is extruded by an extrusion nozzle with a circular aperture with a projection for forming each flute of the plurality of flutes.

7. The method of claim 1, wherein the second blank has a different length than the first blank.

8. The method of claim 1, wherein, after the step of extruding the endless blank and before the step of reworking the first blank, the first angle of twist (D1) of each coolant channel is substantially equal to the second angle of twist (D2) of each flute, and
   wherein, after the step of reworking the first blank, the first angle of twist (D1) of each coolant channel is different than the second angle of twist (D2) of each flute.

\* \* \* \* \*